FILLING APPARATUS WITH AN AUTOMATIC STOP
Filed Jan. 12, 1955
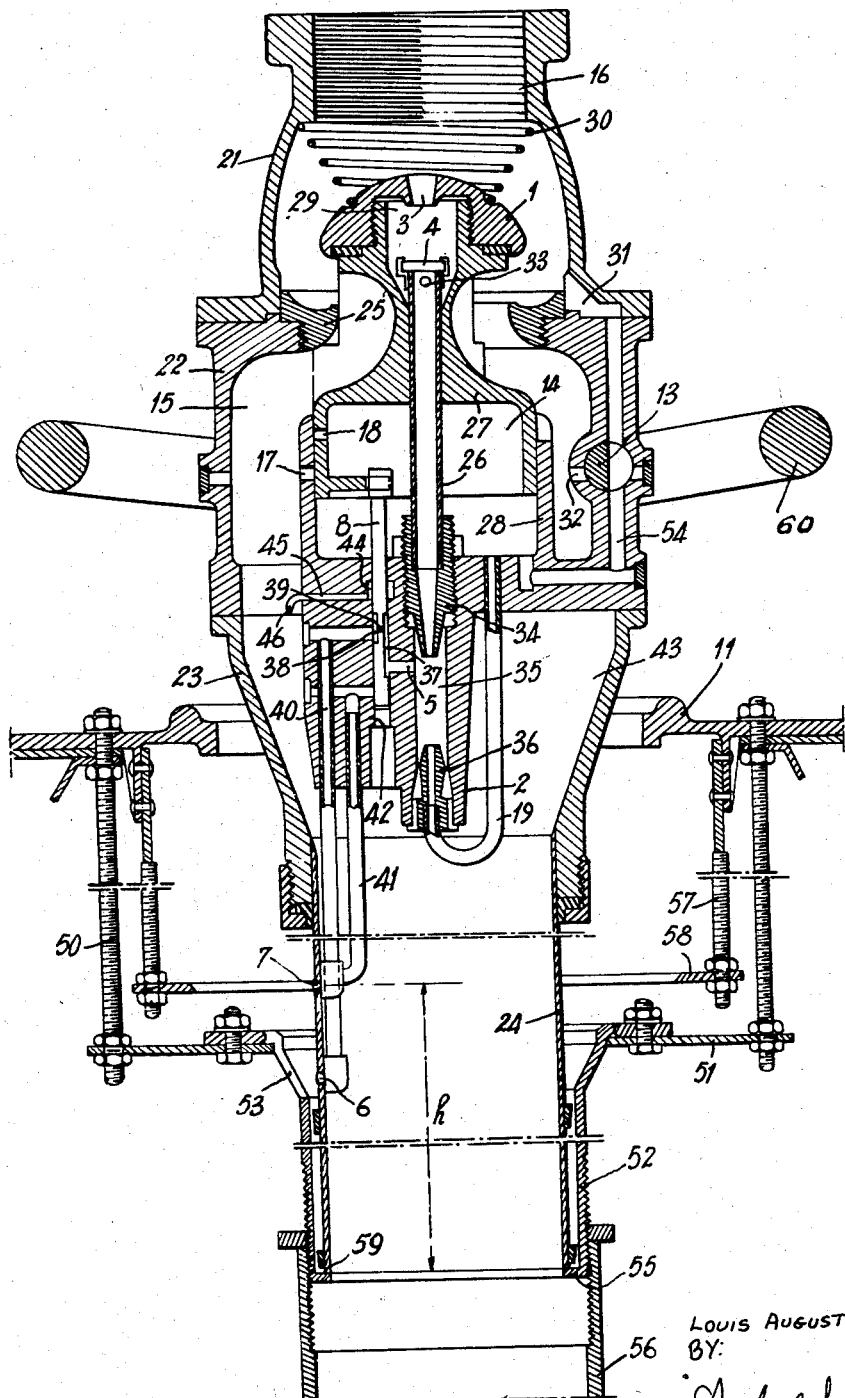
INVENTOR:
LOUIS AUGUSTE CARRIOL
BY:

United States Patent Office 2,871,894
Patented Feb. 3, 1959

2,871,894

FILLING APPARATUS WITH AN AUTOMATIC STOP

Louis Auguste Carriol, Aulnay-sous-Bois, France, assignor to S. A. T. A. M., Societe Anonyme pour Tous Appareillages Mecaniques, Leclerc a la Courneuve, France, a French company Application January 12, 1955, Serial No. 481,446

Claims priority, application France January 18, 1954

9 Claims. (Cl. 141—209)

The object of the present invention is an apparatus for filling containers which automatically causes a decrease in the rate of flow of the liquid when the level of the latter in the container reaches a predetermined level, called "slow down level," and a complete stopping of the flow when the level of the liquid in the container reaches a certain level called a "limiting level" and located, of course, above the slow down level.

With this object in view, the filing device of the present invention consists mainly in a hollow valve body having inlet and outlet means and a valve seat therebetween. A valve member is arranged in the valve body for movement relative to the valve seat between a closed position wherein this valve member engages the valve seat so as to prevent the flow of liquid through the valve body, an intermediate position wherein the valve member is spaced a first distance from the valve seat so as to permit liquid to flow through the valve body at a final delivery rate, and an open position wherein the valve member is spaced a second distance greater than the first distance from the valve seat so as to permit liquid to flow through the valve body at a normal delivery rate greater than the final delivery rate. The valve member is constantly urged into its closed position, and operating means are provided for maintaining the valve member in its open position during the flow of liquid into the receptacle until the liquid has attained the slow-down level, for thereupon moving the valve member into and maintaining the same in its intermediate position during the continued flow of liquid into the receptacle until the liquid has attained the final limiting level, and for thereupon moving the valve member into and maintaining the same in its closed position. The operating means include fluid pressure operable means for holding the valve member exterior of its closed position against the action of the force constantly urging the valve member thereinto, a pressure fluid conduit having an open end and having its other end in communication with the fluid pressure operable means, a nozzle member facing the open end of said pressure fluid conduit and communicating with the interior of the valve body at least when the valve member is exterior of its closed position, first conduit means opening at one end thereof within the receptacle at the slow-down level, second conduit means opening at one end thereof within the receptacle at the final level, and valve means for placing the other end of the first conduit means, when said valve member is in open position, in communication with the region intermediate the nozzle member and said open end of the pressure fluid conduit and for placing the other end of the second conduit means, when the valve member is in its intermediate position in communication with the region intermediate the nozzle member.

Preferably the invention includes also positioning means for positioning the valve device at least partly in the receptacle in such a manner that liquid leaving the outlet means of the valve body flows into the receptacle and also in such a manner that the one end of the second conduit means of the operating means is at the final level, whereby the flow of liquid into the receptacle is automatically stopped when the final level is attained.

By way of example only, the appended drawing shows, diagrammatically an apparatus according to the present invention.

The body of the apparatus represented in the appended drawing comprises an inlet tubing 21, a spacer part 22, an outlet tubing 23 and a plunger tube 24. A valve seat 25 of a valve 1 is screwed onto the part 22. Valve member 1 is capable of sliding on a tube 26, secured to part 22. This valve 1 forms a movable unit with a piston 27 capable of moving inside a cylinder 28, associated with the part 22. The piston 27 and the cylinder 28 form a chamber 14. The piston 27 is hooked onto a distributing slide-valve rod 8. The piston 27 and cylinder 28 are provided respectively with holes 18 and 17 which may come in coincidence and then place the chamber 14 in communication with a chamber 15 through which the liquid flows after it has passed through the valve 1. The top of the valve 1 is provided with an orifice 3, connecting the portion 16 of the pipe located upstream of the seat 25 and a chamber 29 inside the valve 1. A spring 30, bearing on the tubing 21 pushes the valve 1 towards its seat 25. A by-pass conduit 31 connects the chamber 16 with a cock 13. Conduits 32 and 54 connect the latter respectively with the chambers 15 and 14.

The tube 26 opens into the chamber 29 through orifices 33. The upper end of this tube 26 is closed by a tight packing 4 which closes the orifice 3 when the valve 1 engages its seat 25. This tube 26 opens, through a nozzle 34 into a chamber 35 which is in communication through its lower portion with the chamber 43 formed by the outlet tubing 23. A pressure tap 36, of the Pitot tube type, is arranged in this chamber 35 facing the nozzle 34 and element 36 is in communication through a conduit 19 with the chamber 14. This chamber 35, on the other hand, is in communication through a conduit 5 with the housing inside which the slide valve 8 moves. The latter is formed, on its side facing the conduit 5, with a longitudinal groove 37 which may come in coincidence with the conduit 5 and, on the opposite side, with a groove 38 which is in communication with the longitudinal groove 37 through a transverse hole 39. This groove 38 may come in coincidence with one or the other of the conduits 40 or 41, which open into the reservoir 11 to be filled, respectively through orifice 6 or 7. The body 2 in which the housing 35 is formed and the body 42 in which the housing for the slide valve 8 is formed are associated with the intermediate part 22. The housing in which the slide valve 8 moves comprises a flared portion 44 which collects the liquid which has passed between the slide valve 8 and its housing. A passage 45, terminated by a piece of tubing 46 protruding into the chamber 15 and facing downstream, makes it possible to drain off the liquid collected in the flared portion 44. The distance $h$ from the orifice 7 to the lower end 59 of the tube 24 is constant in all pipes of one type according to the invention. Further, screws 50 which support a ring 51 are secured to the reservoir 11. A support 52 is secured by means of screws to ring 52. Support 52 includes a window 53 facing the orifice 6 and an inner shoulder 55 on which the lower end 59 of the tube 24 rests. A tube 56 extends the support 52 and may be adjusted in height by screwing or unscrewing on the latter. In addition, the container 11 supports, by means of screws 57 a ring 58 which is so placed as to set the so-called limiting level of the liquid inside the container 11 when the latter contains a predetermined amount of liquid. If the position of ring 58 is fixed and the position of the connection 52 is set, by means of the screws 50 in such a manner that the distance from the ring 58 to the shoulder 55 be equal to $h$, the orifice 7 will automatically be at the level of the ring 58, when the end 59 of the tube 24 rests on the shoulder 55. Under such conditions, the position of the orifice 7 in the container to be filled 11 corresponds to the limiting level which the liquid can reach in the reservoir 11 and should not exceed. The orifice 6 is arranged lower than the orifice 7 at the so-called slow down level. A handle 60 makes it possible to handle the apparatus.

The operation of the filling device is as follows:

When the device is closed, the valve 1 is on its seat 25, the hole 3 is closed by the packing 4 and the cock 13 is in the position which closes the conduit 31. The pressure of the liquid upstream of the seat 25 thus cannot be transmitted to the chamber 14 and the valve 1 cannot open.

The device is then introduced into the reservoir 11, with the end 59 of the tube 24 bearing on the shoulder 55 of the part 52, and the cock 13 is turned to the position represented in the drawing. The pump for forcing back the liquid is then started. The pressure of the liquid upstream of the seat 25 is then transmitted through the conduits 31 and 54 to the chamber 14. The effective section of the piston 27 being larger than that of the valve 1, the moving unit 1, 27 rises. The valve 1 opens. The liquid then flows into the chamber 15 then into the chamber 43 and enters the container 11 through the tube 24. At the same time the rising of the valve 1 moves the orifice 3 from the packing 4 and the liquid also flows through the orifice 3, fills the chamber 29, goes through the orifices 33 into the tube 26, goes through the nozzle 34, forming a jet of liquid in the chamber 35. This liquid jet strikes the pressure tap 36 and raises the pressure in the tube 19 up to a value which may reach, substantially, that of the pressure obtaining upstream of the seat 25. This pressure is transmitted to the chamber 14. The piston 27 is thus pushed back and held in its upper position and the valve 1 is wide open in spite of the spring 30. In this position the chamber 35 is in communication through the conduit 5, the groove 37, the duct 39, the groove 38 and the tube 40 with the orifice 6. The liquid jet issuing from the nozzle 34 drives along some air from the container 11 through 6, 40, 38, 39, 37 and 5. The cock 13 is then brought to such a position that it isolates the conduits 31, 32, and 54.

When the liquid in the container 11 reaches the level of the orifice 6, the air in the container 11, which was sucked in, heretofore by the liquid jet issuing from the nozzle 34, can no longer come into the chamber 35. The liquid jet issuing from the nozzle 34 spreads out and the pressure in the tube 19 and consequently inside the chamber 14 drops. The piston 27, on the lower face of which the pressure has decreased, cannot resist the action of the liquid and of the spring 30 on the valve 1, so that the unit 1, 27 moves downwards. During this displacement, the holes 17 and 18 come in coincidence. At that time, the communication 5, 37, 39, 38, 40, is cut off and the chamber 35 is placed in communication through the conduit 5, the groove 37, the hole 39 and the groove 38, the tube 41 and the orifice 7 with the reservoir 11. The air from the reservoir 11 can again reach the chamber 35. The liquid jet issuing from the nozzle 34 re-assumes its straight shape and restores a pressure inside the conduit 19 and chamber 14, and the liquid forced back through the conduit 19 into the chamber 14 flows through the holes 18 and 17. The piston 27 remains in the position corresponding to the coincidence of the holes 17 and 18. The valve 1 is thus immobilized in an intermediate opening position. The rate of flow of the liquid is thus decreased and the flow continues until the time when the liquid reaches the level of the orifice 7. The air from the container 11 then can no longer reach the chamber 35. The liquid jet again spreads out and the pressure drops as indicated previously and the piston 27 moves down until the time when the valve 1 rests on its seat 25 and the orifice 3 is closed by the packing 4. The flow then ceases and the container 11 is filled up to the level determined by the ring 58.

If, for some reason or other, it is desired to stop immediately the filling which is under way, the cock 13 is pivoted so as to place the chamber 14 in communication with the chamber 15 through the conduits 32 and 54. In such a case, the two faces of the piston 14 are at the same pressure and the valve 1 closes under the action of the stream of liquid, causing the stopping of the flow.

What is claimed is:

1. A filling device for controlling the flow of a liquid into a receptacle or the like in such a manner that the liquid flows into the receptacle at a normal delivery rate until it reaches a slow-down level and thereafter continues to flow into the receptacle at a slower final delivery rate until it reaches a final level higher than said slow-down level, comprising, in combination, a hollow valve body having inlet and outlet means and a valve seat therebetween; a valve member arranged in said valve body for movement relative to said valve seat between a closed position wherein said valve member engages said valve seat so as to prevent the flow of liquid through said valve body, an intermediate position wherein said valve member is spaced a first distance from said valve seat so as to permit liquid to flow through said valve body at a final delivery rate, and an open position wherein said valve member is spaced a second distance greater than said first distance from said valve seat so as to permit liquid to flow through said valve body at a normal delivery rate greater than said final delivery rate, said valve member being constantly urged into its closed position; and operating means for maintaining said valve member in its open position during the flow of liquid into the receptacle until the liquid has attained said slow-down level, for thereupon moving said valve member into and maintaining the same in its intermediate position during the continued flow of liquid into the receptacle until the liquid has attained said final level, and for thereupon moving said valve member into and maintaining the same in its closed position, said operating means including fluid pressure operable means for holding said valve member exterior of its closed position against the action of the force constantly urging said valve member thereinto, a pressure fluid conduit having an open end and having its other end in communication with said fluid pressure operable means, a nozzle member facing said open end of said pressure fluid conduit and communicating with the interior of said valve body at least when said valve member is exterior of its closed position, first conduit means opening at one end thereof within the receptacle at said slow-down level, second conduit means opening at one end thereof within the receptacle at said final level, and valve means for placing the other end of said first conduit means, when said valve member is in its open position, in communication with the region intermediate said nozzle member and said open end of said pressure fluid conduit and for placing the other end of said second conduit means, when said valve member is in its intermediate position, in communication with said region.

2. A filling device as defined in claim 1 and additional valve means placing said nozzle member in communication with the interior of said valve body when said valve member is exterior of its closed position and for placing said nozzle member out of communication with the interior of said valve body when said valve member is in its closed position.

3. A filling device as defined in claim 2 wherein said fluid pressure operable means is so constructed and arranged that the exertion thereon, when said valve member is in its closed position, of a pressure equal to the pressure prevailing in that portion of the interior of said valve body which is upstream of said valve seat is sufficient to cause said fluid pressure operable means to move said valve member out of its closed position, the valve device further comprising additional conduit means and valve control means therefor for placing the upstream portion of the interior of said valve body in communication with said fluid pressure operable means, whereby said valve member may be initially moved out of its closed position.

4. A filling device as defined in claim 3, and additional conduit means for placing said fluid pressure operable means in communication with the interior of said valve body when said fluid pressure operable means occupies a position corresponding to intermediate position of said valve member.

5. A filling device as defined in claim 3 wherein said fluid pressure operable means include a cylinder element and a piston element slidably arranged therein, one of said elements being fixedly arranged within said valve body and the other of said elements being movable with said valve member.

6. A filling mechanism of the character described, comprising, in combination, a receptacle to be filled to a predetermined final level; a valve device as defined in claim 1; and positioning means for positioning said valve device at least partly in said receptacle in such a manner that liquid leaving said outlet means of said valve body flows into said receptacle and also in such a manner that said one end of said second conduit means of said operating means is at said final level, whereby the flow of liquid into said receptacle is automatically stopped when said final level is attained.

7. A filling device, comprising, in combination, valve means for controlling the flow of a liquid into a receptacle, said valve means including a valve seat and a valve member mounted in said device for movement relative to said valve seat, said valve member being movable between a closed position wherein said valve member engages said valve seat so that the flow of liquid through said valve means is prevented, an intermediate position wherein said valve member is spaced a first distance from said valve seat so that liquid may flow through said valve means at a final delivery rate, and an open position wherein said valve member is spaced from said valve seat a distance greater than said first distance so that liquid may flow through said valve means at a normal delivery rate which is greater than said final delivery rate; and operating means associated with said valve member for maintaining the same in said open position during the flow of liquid into the receptacle until the liquid has attained a slow-down level which is lower than a final level to which the receptacle is to be filled, for thereupon moving said valve member into and maintaining the same in said intermediate position during the continued flow of liquid into the receptacle until the liquid has attained said final level, and for thereupon moving said valve member into and maintaining the same in said closed position.

8. A filling device, comprising, in combination, valve means for controlling the flow of a liquid into a receptacle, said valve means including a valve seat and a valve member mounted in said device for movement relative to said valve seat, said valve member being movable between a closed position wherein said valve member engages said valve seat so that the flow of liquid through said valve means is prevented, an intermediate position wherein said valve member is spaced a first distance from said valve seat so that liquid may flow through said valve means at a final delivery rate, and an open position wherein said valve member is spaced from said valve seat a distance greater than said first distance so that liquid may flow through said valve means at a normal delivery rate which is greater than said final delivery rate; operating means for moving said valve member between said position; upper sensing means arranged in the receptacle and located at a final level to which the receptacle is to be filled; lower sensing means arranged in the receptacle and located at a level lower than said final level; and means connecting each of said sensing means to said operating means for causing the latter to maintain said valve member in said open position during the flow of liquid into the receptacle until the liquid has attained said lower level, for thereupon causing said operating means to move said valve member into and maintain the same in said intermediate position during the continued flow of liquid into the receptacle until the liquid has attained said final level, and for thereupon causing said operating means to move said valve member into and maintain the same in said closed position.

9. A filling device, comprising, in combination, valve means for controlling the flow of a liquid into a receptacle, said valve means including a valve seat and a valve member mounted in said device for movement relative to said valve seat, said valve member being movable between an open position in which said valve member is spaced from said valve seat and a closed position in which said valve member engages said valve seat; operating means for moving said valve member between said positions; upper sensing means arranged in the receptable and located at a final level to which the receptacle is to be filled; lower sensing means arranged in the receptacle and located at a level lower than said final level; and means connecting each of said sensing means to said operating means for causing the latter to maintain said valve member in said open position during the flow of liquid into the receptacle until the liquid has attained said lower level, for thereupon causing said operating means to move said valve member from said open position toward said closed position during the continued flow of liquid into the receptacle until the liquid has attained said final level, and for thereupon causing said operating means to move said valve member into and maintain the same in said closed position.

References Cited in the file of this patent

UNITED STATES PATENTS

| | | |
|---|---|---|
| 2,330,704 | Grise | Sept. 28, 1943 |
| 2,367,138 | Payne | Jan. 9, 1945 |
| 2,445,524 | Grise | July 20, 1948 |
| 2,527,760 | Piqurez | Oct. 31, 1950 |
| 2,529,936 | Grise | Nov. 14, 1950 |
| 2,703,195 | Froidevaux | Mar. 1, 1955 |